US012574238B2

(12) United States Patent
Cheon et al.

(10) Patent No.: US 12,574,238 B2
(45) Date of Patent: Mar. 10, 2026

(54) ELECTRONIC DEVICE AND CONTROLLING METHOD FOR INCREASING AN OPERATION SPEED OF HOMOMORPHIC ENCRYPTED DATA

(71) Applicants:CRYPTO LAB INC., Seoul (KR); SEOUL NATIONAL UNIVERSITY R&DB FOUNDATION, Seoul (KR)

(72) Inventors: Jung Hee Cheon, Seoul (KR); Wonhee Cho, Suwon-si (KR); Taekyung Kim, Seoul (KR)

(73) Assignees: CRYPTO LAB INC., Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 68 days.

(21) Appl. No.: 18/421,363

(22) Filed: Jan. 24, 2024

(65) Prior Publication Data

US 2024/0250816 A1 Jul. 25, 2024

(30) Foreign Application Priority Data

Jan. 25, 2023 (KR) ........................ 10-2023-0009570

(51) Int. Cl.
 *H04L 29/06* (2006.01)
 *H04L 9/00* (2022.01)
 *H04L 9/30* (2006.01)
(52) U.S. Cl.
 CPC ............ *H04L 9/3093* (2013.01); *H04L 9/008* (2013.01)
(58) Field of Classification Search
 CPC .............................. H04L 9/3093; H04L 9/008
 See application file for complete search history.

(56) References Cited

U.S. PATENT DOCUMENTS 6,026,420 A * 2/2000 DesJardins ............. G06F 7/724
708/492
2023/0236801 A1* 7/2023 Parhi ..................... G06F 7/5443
708/523

FOREIGN PATENT DOCUMENTS

GB 2480260 A * 11/2011 ......... H04L 63/0428

OTHER PUBLICATIONS

Abbas et al., "Computational and implementation complexity of polynomial evaluation schemes", 2011 NORCHIP, Lund, Sweden, pp. 1-6 (Year: 2011).*

(Continued)

*Primary Examiner* — Morshed Mehedi
(74) *Attorney, Agent, or Firm* — Steinfl + Bruno LLP

(57) ABSTRACT

Disclosed are an electronic device and a controlling method. The method of controlling an electronic device includes: converting a first polynomial into a first sub-polynomial based on each term and coefficient of a first polynomial, and converting a second polynomial into a second sub-polynomial based on each term and coefficient of a second polynomial; acquiring a calculated sub-polynomial by performing a multiplication operation on the converted first sub-polynomial and the converted second sub-polynomial; removing coefficients greater than or equal to a preset number of digits from coefficients of the calculated sub-polynomial divided based on each term unit of the first polynomial and the second polynomial; and determining coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial.

15 Claims, 7 Drawing Sheets

(56) References Cited

OTHER PUBLICATIONS

Yang et al., "QuickSilver: Efficient and Affordable Zero-Knowledge Proofs for Circuits and Polynomials over Any Field", CCS '21: Proceedings of the 2021 ACM SIGSAC Conference on Computer and Communications Security pp. 2986-3001 (Year: 2021).*

* cited by examiner

100

110 120

ELECTRONIC DEVICE AND CONTROLLING METHOD FOR INCREASING AN OPERATION SPEED OF HOMOMORPHIC ENCRYPTED DATA

BACKGROUND

Field

Apparatuses and methods consistent with the disclosure relate to an electronic device and controlling method for processing homomorphic encrypted data, and more particularly, to an electronic device and controlling method for increasing an operation speed of homomorphic encrypted data.

Description of the Related Art

Homomorphic encryption is a method of performing an operation in an encrypted state and is used to protect information in various fields. Approximate homomorphic encryption performs a multiplication operation of two polynomials and uses a number theoretic transform (NTT) method to reduce the complexity of the multiplication operation. In order for the NTT to be used, given a prime number q that satisfies certain properties, the polynomial should be defined as $Zq[x]/(xN+1)$. Residue number system (RNS) homomorphic encryption for arithmetic of approximate numbers (HEAAN) is composed of a product of prime numbers that satisfy the above-mentioned properties, but a binary HEAAN is defined as the polynomial $ZQ[x]/(xN+1)$ (Q is defined as a power of 2), and therefore, requires a process of converting into a field composed of the product of prime numbers.

The multiplication operation performs the multiplication of the polynomial using the NTT method in the field of each prime number through a Chinese remainder theorem (CRT) process, and returns the polynomial to the existing field through an iCRT process. The time taken for the CRT process is longer than that taken for the NTT process. Therefore, there is a need for technology capable of improving the operation speed by processing the CRT process in a different way.

SUMMARY

The disclosure improves homomorphic encryption performance by improving an operation speed in homomorphic encryption.

According to an embodiment of the disclosure, a method of controlling an electronic device includes: converting a first polynomial into a first sub-polynomial based on each term and coefficient of the first polynomial, and converting a second polynomial into a second sub-polynomial based on each term and coefficient of the second polynomial; acquiring a calculated sub-polynomial by performing a multiplication operation on the converted first sub-polynomial and the converted second sub-polynomial; removing coefficients greater than or equal to a preset number of digits from coefficients of the calculated sub-polynomial divided based on each term unit of the first polynomial and the second polynomial; and determining coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial.

Each coefficient of the first sub-polynomial and the second sub-polynomial may be set to less than or equal to a preset q bit.

The method may further include rearranging the calculated coefficients of the sub-polynomial when the calculated coefficients of the sub-polynomial exceed the preset q bit.

A highest difference of the first sub-polynomial and the second sub-polynomial may be set to k, and the k may be set to an integer where $q^k > NQ^2$ so that a modulo operation does not occur during the multiplication operation.

The first sub-polynomial and the second sub-polynomial may be elements included in a set of polynomials of modulo B, and the B may be set to a prime number with $B > kNq^2$ so that the modulo operation does not occur during the multiplication operation.

According to an embodiment of the disclosure, an electronic device includes: a memory; and a processor, in which the processor may be configured to convert a first polynomial into a first sub-polynomial based on each term and coefficient of the first polynomial stored in the memory and convert a second polynomial into a second sub-polynomial based on each term and coefficient of the second polynomial stored in the memory, acquire a calculated sub-polynomial by performing a multiplication operation on the converted first sub-polynomial and the converted second sub-polynomial, remove coefficients greater than or equal to a preset number of digits from coefficients of the calculated sub-polynomial divided based on each term unit of the first polynomial and the second polynomial, and determine coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial.

The processor may be configured to set each coefficient of the first sub-polynomial and the second sub-polynomial to less than or equal to a preset q bit.

The processor may be configured to rearrange the calculated coefficients of the sub-polynomial when the calculated coefficients of the sub-polynomial exceed the preset q bit.

The processor may be configured to set a highest difference of the first sub-polynomial and the second sub-polynomial to k, and the k may be set to an integer where $q^k > NQ^2$ so that a modulo operation does not occur during the multiplication operation.

The first sub-polynomial and the second sub-polynomial may be elements included in a set of polynomials of modulo B, and the processor may be configured to set the B to a prime number with $B > kNq^2$ so that the modulo operation does not occur during the multiplication operation.

According to an embodiment of the disclosure, there is provided a non-transitory computer-readable storage medium in which a program performing a method of controlling an electronic device is recorded, in which the method includes: converting a first polynomial into a first sub-polynomial based on each term and coefficient of the first polynomial, and converting a second polynomial into a second sub-polynomial based on each term and coefficient of the second polynomial; acquiring a calculated sub-polynomial by performing a multiplication operation on the converted first sub-polynomial and the converted second sub-polynomial; removing coefficients greater than or equal to a preset number of digits from coefficients of the calculated sub-polynomial divided based on each term unit of the first polynomial and the second polynomial; and determining coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial.

Each coefficient of the first sub-polynomial and the second sub-polynomial may be set to less than or equal to a preset q bit.

The method may further include rearranging the calculated coefficients of the sub-polynomial when the calculated coefficients of the sub-polynomial exceed the preset q bit.

A highest difference of the first sub-polynomial and the second sub-polynomial may be set to k, and the k may be set to an integer where $q^k > NQ^2$ so that a modulo operation does not occur during the multiplication operation.

The first sub-polynomial and the second sub-polynomial may be elements included in a set of polynomials of modulo B, and the B may be set to a prime number with $B > kNq^2$ so that the modulo operation does not occur during the multiplication operation.

According to various exemplary embodiments of the disclosure, it is possible to improve homomorphic encryption performance by improving an operation speed by using a similar NTT method instead of a CRT process.

The effects of the disclosure are not limited to the above-described effects, and other effects that are not mentioned may be obviously understood by those skilled in the art from the following description.

BRIEF DESCRIPTION OF THE DRAWING FIGURES

The above and/or other aspects of the disclosure will be more apparent by describing certain exemplary embodiments of the disclosure with reference to the accompanying drawings, in which.

DETAILED DESCRIPTION OF THE EXEMPLARY EMBODIMENTS

Figure 1:
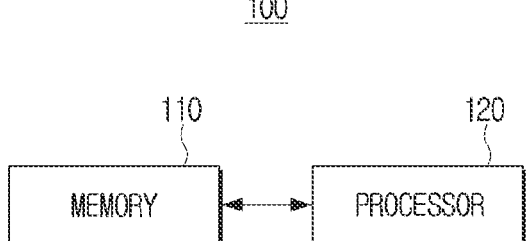
FIG. 1 is a block diagram illustrating a configuration of an electronic device according to an embodiment of the disclosure.

Hereinafter, various exemplary embodiments will be described in more detail with reference to the accompanying drawings. Exemplary embodiments mentioned in the present specification may be variously modified. A specific exemplary embodiment may be illustrated in the drawings and be described in detail in a detailed description. However, the specific exemplary embodiment illustrated in the accompanying drawings is provided only to allow various exemplary embodiments to be easily understood. Therefore, it should be understood that the spirit of the disclosure is not limited by the specific exemplary embodiment illustrated in the accompanying drawings, but includes all the modifications, equivalents, and substitutions included in the spirit and the scope of the disclosure.

Terms including ordinal numbers such as "first", "second", and the like, may be used to describe various components. However, these components are not limited by these terms. The terms are used only to distinguish one component from another component.

It should be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof. It is to be understood that when one element is referred to as being "connected to" or "coupled to" another element, it may be connected directly to or coupled directly to another element or be connected to or coupled to another element, having the other element intervening therebetween. On the other hand, it should be understood that when one element is referred to as being "connected directly to" or "coupled directly to" another element, it may be connected to or coupled to another element without the other element interposed therebetween.

Meanwhile, a term "module" or "~er/~or" for components used in the present specification performs at least one function or operation. In addition, a "module" or a "~er/~or" may perform a function or an operation by hardware, software, or a combination of hardware and software. In addition, a plurality of "modules" or a plurality of "~ers/~ors" except for a "module" or a "~er/~or" performed by specific hardware or performed by at least one processor may be integrated in at least one module. Singular forms are intended to include plural forms unless the context clearly indicates otherwise.

In the description of the disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In this specification, "A or B" is defined to mean not only selectively indicating either one of A and B, but also including both A and B. In addition, in the present specification, the term "include" has a meaning encompassing further including other components in addition to elements listed as included.

In the present specification, only essential components necessary for the description of the disclosure are described, and components unrelated to the essence of the disclosure are not mentioned. In addition, it should not be interpreted as an exclusive meaning that includes only the mentioned components, but should be interpreted as a non-exclusive meaning that may include other components.

In addition, in describing the disclosure, when it is decided that a detailed description for the known functions or configurations related to the disclosure may unnecessarily obscure the gist of the disclosure, the detailed description therefor will be omitted. Meanwhile, each embodiment may be implemented or operated independently, but each embodiment may be implemented or operated in combination.

In the disclosure, $Z_Q[x]/(x^N+1)$ is a ring, and may be a set of polynomials of order N−1 or lower in which each coefficient is composed of {0, 1, . . . , Q−1} or {−Q/2, . . . , Q/2−1}. For example, in homomorphic encryption, N may be used in the form of a power of 2. A ciphertext of homomorphic encryption may be in the form of the ring included in the above set, and may perform a multiplication operation on polynomials.

FIG. 1 is a block diagram illustrating a configuration of an electronic device according to an embodiment of the disclosure.

Referring to FIG. 1, an electronic device 100 may include a memory 110 and a processor 120.

The memory 110 may store data, algorithms, and the like that perform functions of the electronic device 100, and store programs, commands, and the like that run on the electronic device 100. In addition, the memory 110 may store a polynomial to perform a homomorphic encryption operation and a sub-polynomial converted from the polynomial. In addition, the memory 110 may store a result of the multiplication operation on the sub-polynomial (e.g., a multiplication operated sub-polynomial).

The processor 120 may control each configuration of the electronic apparatus 100. For example, the processor 120 may load the homomorphic encrypted polynomial stored in the memory 110 and control the memory 110 to store the multiplication operated sub-polynomial.

For the homomorphic encryption operation, multiplication of polynomials that are elements (e.g., coefficients of the polynomial) of $Z_Q[x]/(x^N+1)$ is required. In the case of the related technology, the multiplication operation of the homomorphic encryption may be performed by dividing Q into small units with CRT and using number theoretic transform (NTT). However, the processing time of the CRT process takes longer than that of the NTT process. In addition, the NTT process is easier to parallelize than the CRT process. Therefore, the disclosure performs a multiplication operation of a polynomial using the NTT method for a polynomial with a large order by converting each element into a sub-polynomial without performing the CRT process. In this case, the disclosure may quickly perform a multiplication operation by converting polynomial elements into sub-polynomial elements based on a specific unit.

The processor 120 may convert a first polynomial into a first sub-polynomial based on each term and coefficient of the first polynomial, and convert a second polynomial into a second sub-polynomial based on each term and coefficient of the second polynomial. For example, the first polynomial may be f(x) and the second polynomial may be g(x). The two polynomials may be f(x), g(x)∈$Z_Q[x]/(x^N+1)$. That is, polynomials f(x) and g(x) less than or equal to order N−1 may be elements of a $Z_Q[x]$ ring. The polynomials f(x) and g(x) may be defined as Equation (1).

$$f(x) = \sum\nolimits_{i=0}^{N-1} f_i \cdot x^i \qquad (1)$$
$$g(x) = \sum\nolimits_{i=0}^{N-1} g_i \cdot x^i$$

$f_i$ and $g_i$ are coefficients of each polynomial, and $f_i$ and $g_i$ may be expressed in base q as in Equation (2) for a unit bit q.

$$g_i = \sum\nolimits_{j=0}^{k/2} g_{i,j} \cdot q^j \qquad (2)$$
$$f^*(t) = \sum\nolimits_{i=0}^{N-1} \sum\nolimits_{j=0}^{k/2} f_{i,j} \cdot t^{ki+j}$$

That is, each coefficient is newly expressed by listing numbers like binary, and $f_{i,j}$ and $g_{i,j}$ may be newly expressed coefficients (e.g., coefficients of a sub-polynomial). As an example, q, $f_{i,j}$, $g_{i,j}$ may be in the form of a power of 2 of 64 bits or less, but are not limited thereto.

The processor 120 may substitute $x=t^k$ in the two polynomials f(x) and g(x), and substitute t for q in each coefficient to obtain a new polynomial f*(t), g*(t)∈ for $Z_B[t]/(t^{kN}+1)$. The new polynomial f*(t) may be Equation (3), and g*(t) may also have the same form as Equation (3).

$$f^*(t) = \sum\nolimits_{i=0}^{N-1} \sum\nolimits_{j=0}^{k/2} f_{i,j} \cdot t^{ki+j} \qquad (3)$$
$$f^*(q) = f(q)$$

The polynomial is an element of $Z_Q[x]/(x^N+1)$, and the CRT and NTT were performed on a set of $Z_Q[x]/(x^N+1)$. Here, B is small enough, and thus, only the NTT may be performed at higher orders (e.g., conversion from N into kN) without the need for the CRT process. A highest difference between the first sub-polynomial and the second sub-polynomial may be set to k. The first sub-polynomial and the second sub-polynomial may be elements included in a set of polynomials of modulo B.

k may be an integer that satisfies $q^k > NQ^2$, and B may be a prime number that satisfies $B > kNq^2$. The above-described condition may be a condition set so that a modulo operation does not occur during the multiplication operation. Here, N may denote a highest difference of the first polynomial and the second polynomial, and Q is a prime number and may denote a modulo number at which the modulo operation is performed when a highest difference of operation results of the first polynomial and the second polynomial exceeds Q.

The processor 120 may acquire the calculated sub-polynomial by performing the multiplication operation on the converted first sub-polynomial and the converted second sub-polynomial; For example, the processor 120 may perform the multiplication operation on two polynomials f*(t) and g*(t) using the NTT technique, and acquire $$h^*(t) = f^*(t) \cdot g^*(t) = \sum\nolimits_{i=0}^{kN-1} h_i^* \cdot t^i.$$

That is, h*(t) may be a result acquired using the NTT technique in the ring of the $Z_B[t]/(t^{kN}+1)$ set.

For example, $$h(x) = \sum\nolimits_{i=0}^{kN-1} h_i^* \cdot t^i = f(x) \cdot g(x)(\bmod\ x^N + 1).$$

In this case, since $$\sum_{i=0}^{N-1} h_i \cdot x^i,$$

the $[h_i \bmod Q]$ operation may be performed in the category of $h^*(t)$. In particular, when Q and q are powers of 2, the operation may be easily performed by deleting the latter term. That is, the processor 120 may remove coefficients greater than or equal to a preset number of digits from coefficients of the calculated sub-polynomial divided based on each term unit of the first polynomial and the second polynomial. In addition, the processor 120 may determine the coefficients of the calculated sub-polynomial from which the coefficients greater than or equal to the preset number of digits have been removed as the coefficients of the polynomial acquired by the multiplication operation of the first polynomial and the second polynomial.

In addition, the processor 120 may set each coefficient of the first sub-polynomial and the second sub-polynomial to less than or equal to the preset q bit. When the calculated coefficients of the sub-polynomial exceed the preset q bit, the calculated coefficients of the sub-polynomial may be rearranged. Thereafter, the processor 120 may remove coefficients greater than or equal to the preset number of digits from the calculated coefficients of the sub-polynomial.

Figure 2:
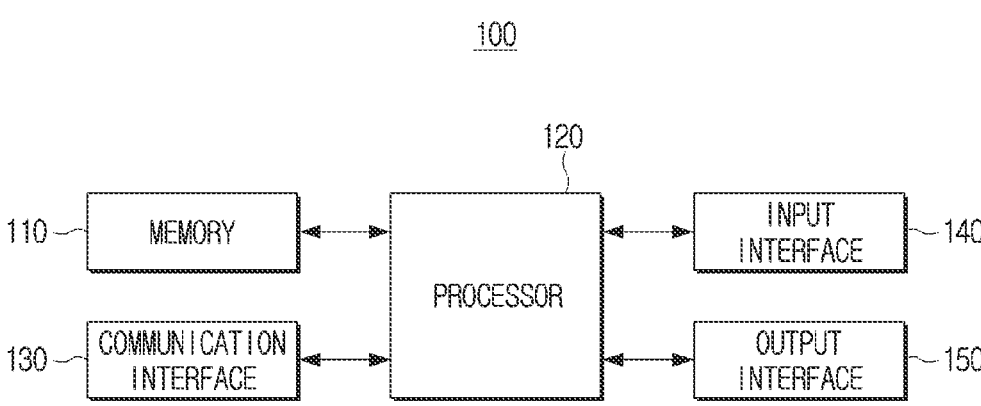
FIG. 2 is a block diagram illustrating a specific configuration of the electronic device according to the embodiment of the disclosure.

FIG. 2 is a block diagram illustrating a specific configuration of the electronic device according to the embodiment of the disclosure.

Referring to FIG. 2, the electronic device 100 may include the memory 110, the processor 120, a communication interface 130, an input interface 140, and an output interface 150. The memory 110 may be the same as described in FIG. 1.

The communication interface 130 may communicate with an external electronic device. The communication interface 130 may receive or transmit homomorphic encrypted data from an external electronic device. The electronic device 100 may store the homomorphic encrypted data received from the external electronic device in the memory 110. The communication interface 130 may communicate with the external device using at least one of the following communication methods: Wi-Fi, Wi-Fi direct, Bluetooth, Zigbee, 3rd Generation (3G), 3rd Generation Partnership Project (3GPP), and Long Term Evolution (LTE). The communication interface 130 may be referred to as a communication device, a communication unit, a communication module, a transceiver, etc.

The input interface 140 may receive control commands from the user. For example, the input interface 140 may include a keyboard, buttons, a key pad, a touch pad, and a touch screen. Alternatively, the input interface 140 may be implemented as an input/output port. In this case, the input interface 140 may be called an input/output port. When the input interface 140 is implemented as an input/output port, the input/output ports include High-Definition Multimedia Interface (HDMI), DisplayPort (DP), RGB, Digital Visual Interface (DVI), Universal Serial Bus (USB), Thunderbolt, audio jacks, video jacks, etc. In addition, the input interface 140 may receive or output the homomorphic encrypted data. The input interface 140 may be called an input device, an input unit, an input module, etc., and when implemented as the input/output port, the input interface 140 may be called an input output device, an input/output unit, an input/output module, etc.

The output interface 150 may output data processed by the processor 120. For example, the output interface 150 may include a speaker and a display. The speaker may output the processed data as a sound signal. The display may output data processed by the processor 120 as an image. For example, the display may be implemented as a liquid crystal display (LCD), an organic light emitting diode (OLED), a flexible display, a touch screen, etc. When the display is implemented as the touch screen, the electronic device 100 may receive control commands through the touch screen.

The electronic device 100 may include all of the above-described components or may include some of the components.

Figure 3:
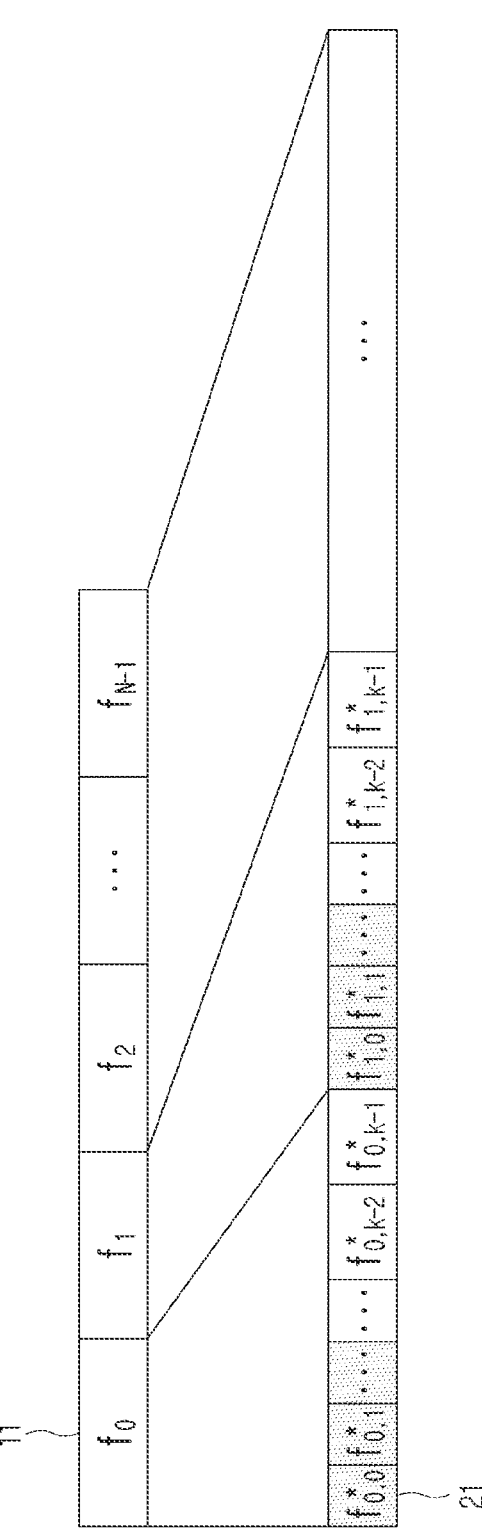
FIG. 3 is a diagram illustrating a sub-polynomial according to an embodiment of the disclosure.

FIG. 3 is a diagram for describing a sub-polynomial according to an embodiment of the disclosure.

Referring to FIG. 3, the coefficients of the polynomial and the coefficients of the sub-polynomial are illustrated. As an example, f may be a first polynomial 11. f may include coefficients $f_0, f_1, f_2, \ldots, f_{N-1}$. The electronic device 100 may convert the first polynomial 11 into a first sub-polynomial 21. The electronic device 100 may convert the first polynomial 11 into the first sub-polynomial 21 based on each term and coefficient of the first polynomial 11. That is, the first sub-polynomial 21 may be a polynomial in which each coefficient of the first polynomial 11 is converted into a plurality of sub-coefficients. As an example, $f_0$ of the first polynomial 11 may be converted into $f^*_{0,0}, f^*_{0,1}, \ldots, f^*_{0,k-1}$. The electronic device 100 may convert the first polynomial 11 into the first sub-polynomial 21 by converting all the coefficients of the first polynomial 11 in the above-described manner. The electronic device 100 may convert a second polynomial (e.g., g) into a second sub-polynomial (e.g., g*) similar to the conversion process of the first polynomial 11. Each coefficient of the first sub-polynomial and the second sub-polynomial may be set to less than or equal to the preset q bit. In one embodiment, the q bit may be 64 bits, but is not limited thereto. The electronic device 100 may perform the multiplication operation of the first sub-polynomial and the second sub-polynomial.

Figure 4:
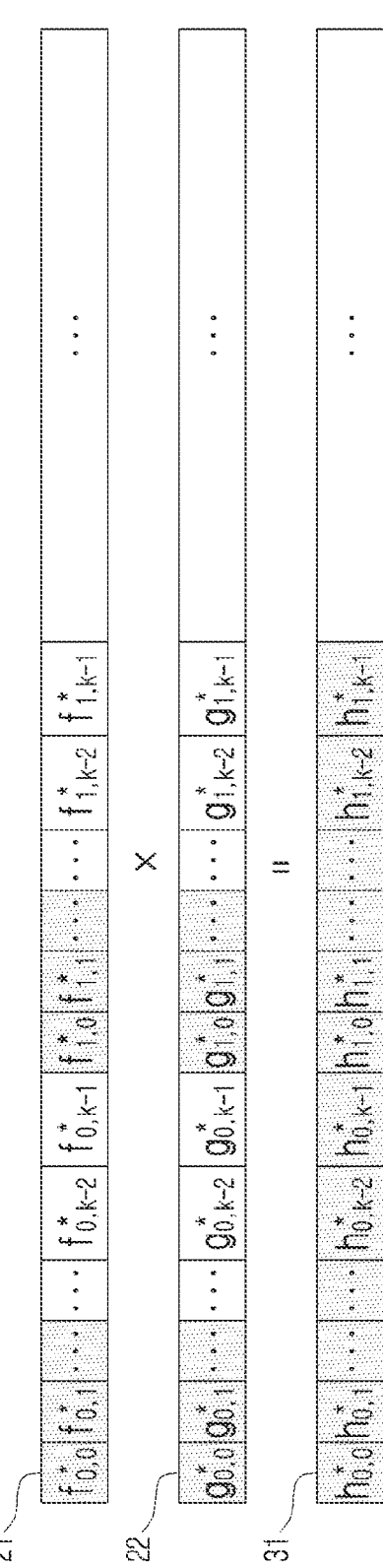
FIG. 4 is a diagram for describing a multiplication operation of a plurality of sub-polynomials according to the embodiment of the disclosure.

FIG. 4 is a diagram for describing a multiplication operation of a plurality of sub-polynomials according to an embodiment of the disclosure.

Referring to FIG. 4, the first sub-polynomial 21, a second sub-polynomial 22, and a multiplication operated sub-polynomial 31 are illustrated. The electronic device 100 may multiply the coefficients of each digit of the first sub-polynomial 21 and each coefficient of the second sub-polynomial 22. Since the disclosure performs the multiplication operation between the homomorphic encrypted polynomials, it is possible to perform a multiplication operation between coefficients of corresponding digits between polynomials. As one embodiment, the electronic device 100 may perform a multiplication operation between $f^*_{0,0}$ and $g^*_{0,0}$, and a multiplication operation between $f^*_{1,k-1}$ and $g^*_{1,k-1}$. By performing the multiplication operation between each polynomial, the electronic device 100 may acquire the multiplication operated sub-polynomial 31. That is, the electronic device 100 may acquire coefficients of $h^*_{0,0}, \ldots, h^*_{0,k-1}$ corresponding to $f_0$ of the first polynomial and $g_0$ of the second polynomial, and acquire coefficients of $h^*_{0,0}, \ldots, h^*_{0,k-1}$ corresponding to $f_1$ of the first polynomial and $g_1$ of the second polynomial.

As described above, the first sub-polynomial and the second sub-polynomial may be expressed by a formula that converts N into k. k may be an integer that satisfies $q^k > NQ^2$ so that the modulo operation does not occur during the multiplication operation.

The electronic device 100 may return the multiplication operated sub-polynomial 31 between the first sub-polynomial 21 and the second sub-polynomial 22 to the field of the original polynomial.

Figure 5:
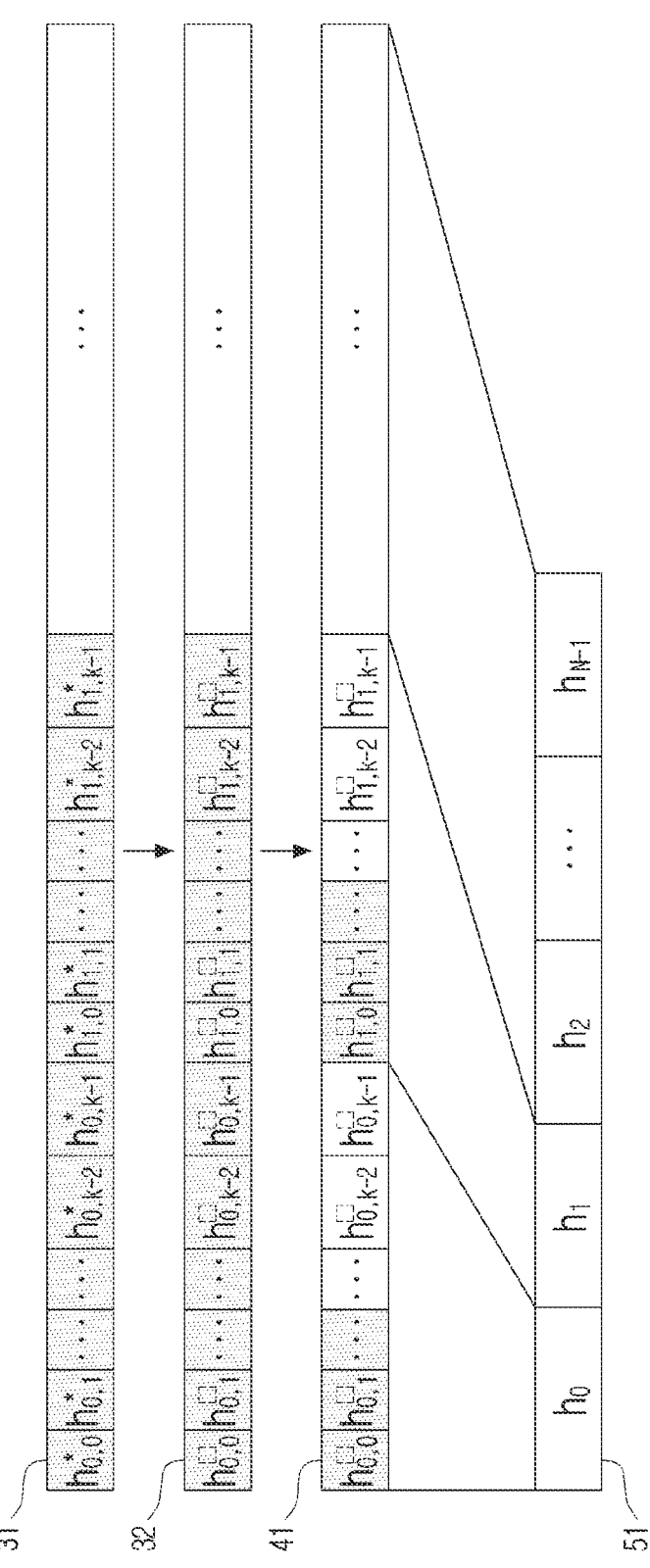
FIG. 5 is a diagram illustrating a process of returning a multiplication operated sub-polynomial to an original field according to an embodiment of the disclosure.

FIG. 5 is a diagram illustrating a process of returning a multiplication operated sub-polynomial to an original field according to an embodiment of the disclosure.

Referring to FIG. 5, the multiplication operated sub-polynomial 31 is illustrated. The electronic device 100 may rearrange the multiplication operated sub-polynomial 31 to acquire a rearranged sub-polynomial 32. For example, each coefficient of the first sub-polynomial 21 and the second sub-polynomial 31 may be set to the q bit, but each coefficient of the multiplication operated sub-polynomial 31 may exceed the q bit. Accordingly, when the coefficient of the multiplication operated sub-polynomial 31 exceeds the q bit, the electronic device 100 may adjust the coefficients so that each coefficient is less than or equal to the q bit. As an example, when described in decimal numbers, if the coefficients of the multiplication operated sub-polynomial are 5 and 16, respectively, the coefficients of the multiplication operated sub-polynomial 31 may be rearranged by adjusting the coefficients to 6 and 6. When there are no coefficients exceeding a q bit as a result of the multiplication operation, the rearranging process may be omitted.

The electronic device 100 may acquire a sub-polynomial 41 by performing a modulo Q operation on the multiplication operated sub-polynomial (or a rearranged sub-polynomial). The electronic device 100 may remove coefficients greater than or equal to the preset number of digits from the sub-polynomial 41 on which the modulo operation has been performed and acquire a final multiplication polynomial 51. Since the electronic device 100 has meaning in the remaining values of the multiplication operation, removing the coefficients greater than or equal to the preset number of digits does not affect the results.

The above-described process is described mathematically as follows.

The multiplication operated sub-polynomial may be expressed as equation (4).

$$h_i = \sum_{j=0}^{k-1} h_{ki+j}^* \cdot q^j \qquad (4)$$

Here, $0 \le h_i^* < kNq^2$

When converting the polynomial into the sub-polynomial, q is converted into t, so when t is converted back into q, the multiplication operated sub-polynomial may be expressed as equation (5).

$$h^*(q) = \sum_{i=0}^{kN-1} h_i^* q^i = \sum_{i=0}^{N-1} \left( \sum_{j=0}^{k-1} q^j h_{i,j} \right) q^{ki} \qquad (5)$$

Here, $h_{i,j} \in [0, q]$

As described above, since $$h(x) = \sum_{i=0}^{N-1} h_i \cdot x^i = f(x) \cdot g(x) (\bmod x^N + 1), \text{ and } h_i = \sum_{j=0}^{k-1} h_{ki+j}^* \cdot q^j,$$

the [$h_i$ mod Q] operation may be performed in the category of h*(t). Therefore, hi is equal to equation (6).

10

$$\bar{h}(x) = \sum_{i=0}^{N-1} \left( \sum_{j=0}^{k-1} q^j h_{i,j} \right) x^i \qquad (6)$$

$$h_i = [\bar{h}(x)]_Q = \sum_{i=0}^{N-1} \left[ \sum_{j=0}^{k-1} q^j h_{i,j} \right]_Q x^i = \sum_{i=0}^{N-1} \sum_{j=0}^{l-1} q^j h_{i,j} x^i$$

Here, since $q^l = Q$, the electronic device 100 may remove the order higher than 1.

Figure 6:
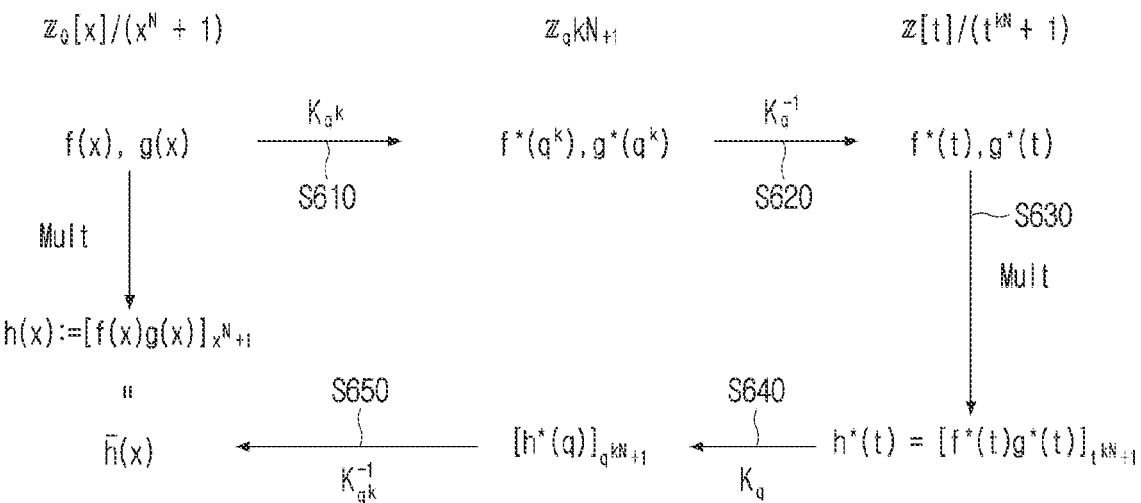
FIG. 6 is a diagram for describing a polynomial operation of the disclosure according to an embodiment of the disclosure.

FIG. 6 is a diagram for describing a polynomial operation of the disclosure according to an embodiment of the disclosure.

Referring to FIG. 6, the process of directly performing the multiplication operation of the first polynomial and the second polynomial and the process of performing the multiplication operation using the disclosure are illustrated.

f(x) and g(x) may be polynomials on which the first multiplication operation is to be performed. When f(x) and g(x) are multiplication operated, $\bar{h}(x)$ is acquired, and when modulo Q operation is performed based on the $\bar{h}(x)$, the final result value may be obtained. As described above, this process has the disadvantage that the CRT and NTT processes should be performed, and the CRT process takes a lot of time. The electronic device 100 of the disclosure may convert polynomials f(x) and g(x) into sub-polynomial f*(t) and g*(t), respectively (S610 and S620). The electronic device 100 may obtain h*(t) by the multiplication operation of the sub-polynomials f*(t) and g*(t) (S630). The electronic device 100 may acquire. $\bar{h}(x)$ in the reverse order of the sub-polynomial conversion process (S640 and S650). In other words, the electronic device 100 does not perform the time-consuming the CRT process through the conversion into the sub-polynomial and the reverse conversion process, but acquires the final result value only through the NTT process, thereby reducing the time required.

Figure 7:
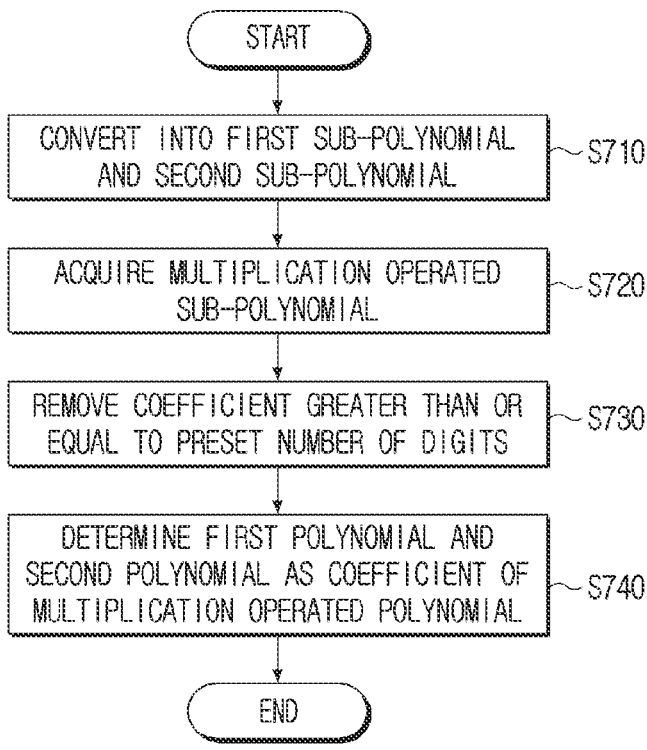
FIG. 7 is a diagram for describing a method of controlling an electronic device according to an embodiment of the disclosure.

FIG. 7 is a diagram for describing a method of controlling an electronic device according to an embodiment of the disclosure.

Referring to FIG. 7, the electronic device 100 may convert the first polynomial into the first sub-polynomial based on each term and coefficient of the first polynomial, and convert the second polynomial into the second sub-polynomial based on each term and coefficient of the second polynomial. For example, a highest difference of the first sub-polynomial and the second sub-polynomial may be set to k, and the k may be set to an integer where $q^k > NQ^2$ so that the modulo operation does not occur during the multiplication operation. N may denote the highest difference of the first polynomial and the second polynomial, and Q is a prime number and may denote the modulo number at which the modulo operation is performed when a highest difference of operation results of the first polynomial and the second polynomial exceeds Q. In addition, the first sub-polynomial and the second sub-polynomial may be elements included in a set of polynomials of modulo B, and the B may be set to a prime number with $B > kNq^2$ so that the modulo operation does not occur during the multiplication operation.

The electronic device 100 may acquire the calculated sub-polynomial by performing the multiplication operation on the converted first sub-polynomial and the converted second sub-polynomial (S720).

The electronic device 100 may remove coefficients greater than or equal to a preset number of digits from coefficients of the calculated sub-polynomial divided based on each term unit of the first polynomial and the second polynomial (S730). Each coefficient of the first sub-polynomial and the second sub-polynomial may be set to less than or equal to the preset q bit. When the calculated coefficients of the sub-polynomial exceed the preset q bit, the electronic device 100 may rearrange the calculated coefficients of the sub-polynomial. The electronic device 100 may determine the coefficients of the sub-polynomial from which the coefficients greater than or equal to the preset number of digits divided based on each term unit of the first polynomial and the second polynomial are removed as the coefficients of the polynomial acquired by the multiplication operation of the first polynomial and the second polynomial (S740).

The method of controlling an electronic device according to the various embodiments described above may be provided as a computer program product. The computer program product may include a S/W program itself or a non-transitory computer readable medium in which the S/W program is stored.

The non-transitory computer-readable medium is not a medium that stores data therein for a while, such as a register, a cache, a memory, or the like, but means a medium that semi-permanently stores data therein and is readable by an apparatus. In detail, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

Although exemplary embodiments of the disclosure have been illustrated and described hereinabove, the disclosure is not limited to the abovementioned specific exemplary embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. A method of controlling an electronic device, comprising:

receiving a first polynomial and a second polynomial via a communication interface of the electronic device;

converting the first polynomial into a first sub-polynomial based on each term and coefficient of a first polynomial, and converting the second polynomial into a second sub-polynomial based on each term and coefficient of a second polynomial;

acquiring a calculated sub-polynomial by performing a multiplication operation on the converted first sub-polynomial and the converted second sub-polynomial;

removing coefficients greater than or equal to a preset number of digits from coefficients of the calculated sub-polynomial divided based on each term unit of the first polynomial and the second polynomial; and determining coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial; and transmitting, via the communication interface, the polynomial acquired by the multiplication operation to an external electronic device.

2. The method as claimed in claim 1, wherein each coefficient of the first sub-polynomial and the second sub-polynomial is set to less than or equal to a preset q bit.

3. The method as claimed in claim 2, further comprising:

rearranging the calculated coefficients of the sub-polynomial when the calculated coefficients of the sub-polynomial exceed the preset q bit.

4. The method as claimed in claim 2, wherein a highest difference of the first sub-polynomial and the second sub-polynomial is set to k, and the k is set to an integer where $q^k > NQ^2$ so that a modulo operation does not occur during the multiplication operation, wherein N denotes a highest difference of the first polynomial and the second polynomial, and Q is a prime number and denotes a modulo number at which the modulo operation is performed when a highest difference of operation results of the first polynomial and the second polynomial exceeds Q.

5. The method as claimed in claim 2, wherein the first sub-polynomial and the second sub-polynomial are elements included in a set of polynomials of modulo B, and the B is set to a prime number with $B > kNq^2$ so that a modulo operation does not occur during the multiplication operation, wherein k denotes a highest difference of the first sub-polynomial and the second sub-polynomial, and N denotes a highest difference of the first polynomial and the second polynomial.

6. An electronic device, comprising:

a communication interface configured to receive a first polynomial and a second polynomial;

a memory configured to store programs that run on the electronic device; and a processor, wherein the processor is configured to convert the first polynomial into a first sub-polynomial based on each term and coefficient of a first polynomial stored in the memory, and convert the second polynomial into a second sub-polynomial based on each term and coefficient of a second polynomial stored in the memory, acquire a calculated sub-polynomial by performing a multiplication operation on the converted first sub-polynomial and the converted second sub-polynomial, remove coefficients greater than or equal to a preset number of digits from coefficients of the calculated sub-polynomial divided based on each term unit of the first polynomial and the second polynomial, determine coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial, and transmit, via the communication interface, the polynomial acquired by the multiplication operation to an external electronic device.

7. The electronic device as claimed in claim 6, wherein the processor is configured to set each coefficient of the first sub-polynomial and the second sub-polynomial to less than or equal to a preset q bit.

8. The electronic device as claimed in claim 7, wherein the processor is configured to rearrange the calculated coefficients of the sub-polynomial when the calculated coefficients of the sub-polynomial exceed the preset q bit.

9. The electronic device as claimed in claim 7, wherein the processor is configured to set a highest difference of the first sub-polynomial and the second sub-polynomial to k, and the k is set to an integer where $q^k > NQ^2$ so that a modulo operation does not occur during the multiplication operation, wherein N denotes a highest difference of the first polynomial and the second polynomial, and Q is a prime number and denotes a modulo number at which the modulo operation is performed when a highest difference of operation results of the first polynomial and the second polynomial exceeds Q.

10. The electronic device as claimed in claim 7, wherein the first sub-polynomial and the second sub-polynomial are elements included in a set of polynomials of modulo B, and the processor is configured to set the B to a prime number with $B>kNq^2$ so that a modulo operation does not occur during the multiplication operation, wherein k denotes a highest difference of the first sub-polynomial and the second sub-polynomial, and N denotes a highest difference of the first polynomial and the second polynomial.

11. A non-transitory computer-readable storage medium in which a program performing a method of controlling an electronic device is recorded, wherein the method includes:

receiving a first polynomial and a second polynomial via a communication interface of the electronic device;

converting the first polynomial into a first sub-polynomial based on each term and coefficient of the first polynomial, and converting the second polynomial into a second sub-polynomial based on each term and coefficient of the second polynomial;

acquiring a calculated sub-polynomial by performing a multiplication operation on the converted first sub-polynomial and the converted second sub-polynomial;

removing coefficients greater than or equal to a preset number of digits from coefficients of the calculated sub-polynomial divided based on each term unit of the first polynomial and the second polynomial;

determining coefficients of a sub-polynomial from which the coefficients greater than or equal to the preset number of digits divided based on each term unit of the first polynomial and the second polynomial are removed as coefficients of a polynomial acquired by the multiplication operation of the first polynomial and the second polynomial; and transmitting, via the communication interface, the polynomial acquired by the multiplication operation to an external electronic device.

12. The non-transitory computer-readable storage medium as claimed in claim 11, wherein each coefficient of the first sub-polynomial and the second sub-polynomial is set to less than or equal to a preset q bit.

13. The non-transitory computer-readable storage medium as claimed in claim 12, wherein the method further includes:

rearranging the calculated coefficients of the sub-polynomial when the calculated coefficients of the sub-polynomial exceed the preset q bit.

14. The non-transitory computer-readable storage medium as claimed in claim 12, wherein a highest difference of the first sub-polynomial and the second sub-polynomial is set to k, and the k is set to an integer where $q^k>NQ^2$ so that a modulo operation does not occur during the multiplication operation, wherein N denotes a highest difference of the first polynomial and the second polynomial, and Q is a prime number and denotes a modulo number at which a modulo operation is performed when a highest difference of operation results of the first polynomial and the second polynomial exceeds Q.

15. The non-transitory computer-readable storage medium as claimed in claim 12, wherein the first sub-polynomial and the second sub-polynomial are elements included in a set of polynomials of modulo B, and the B is set to a prime number with $B>kNq^2$ so that a modulo operation does not occur during the multiplication operation, wherein k denotes a highest difference of the first sub-polynomial and the second sub-polynomial, and N denotes a highest difference of the first polynomial and the second polynomial.

\* \* \* \* \*